Dec. 27, 1932.  W. H. SCHUSSLER  1,892,255
REROLLER FOR CIGAR MACHINES
Filed Feb. 16, 1932  2 Sheets-Sheet 1
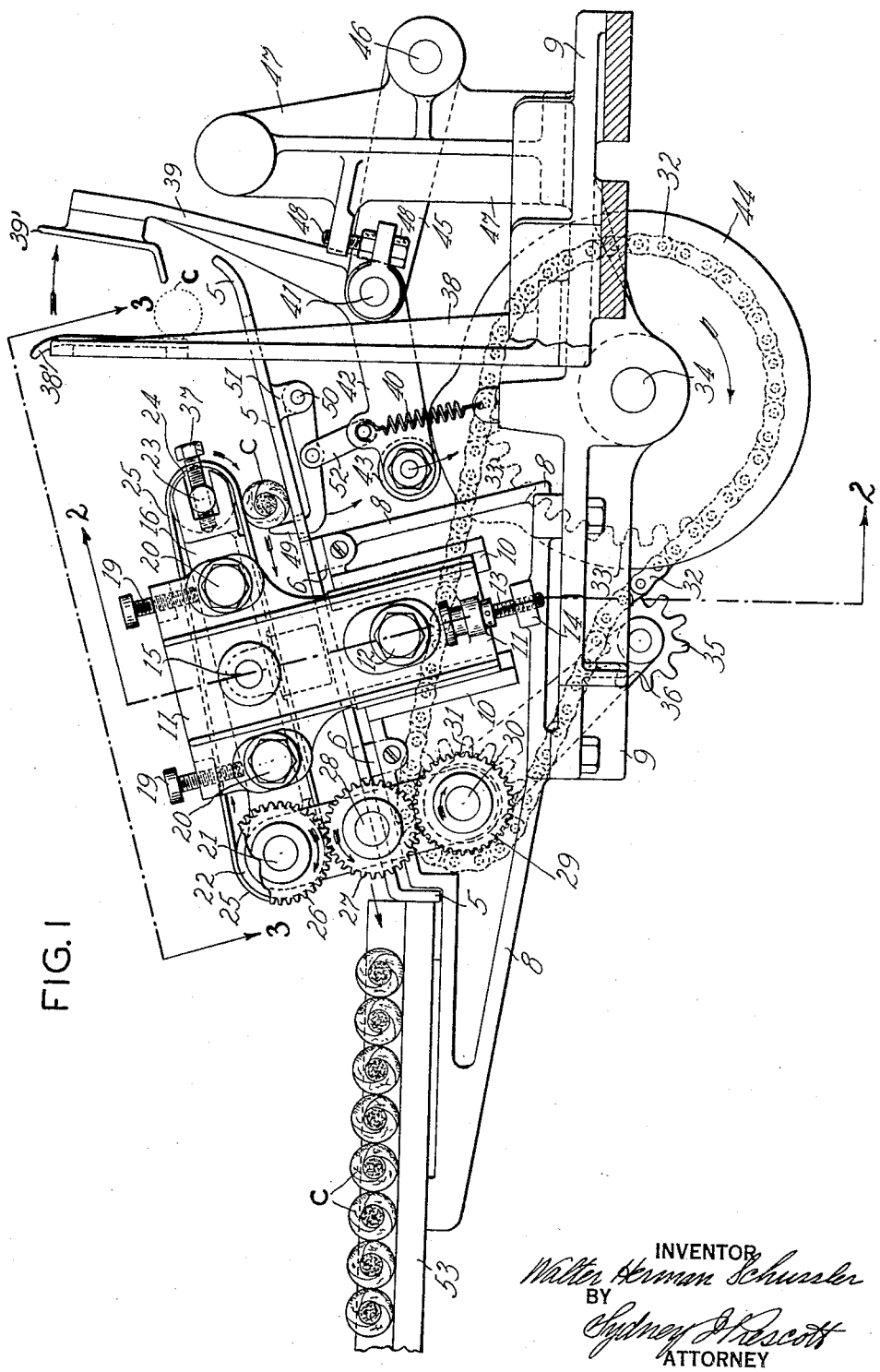
FIG. I
INVENTOR
Walter Herman Schussler
BY
Sydney J. Prescott
ATTORNEY

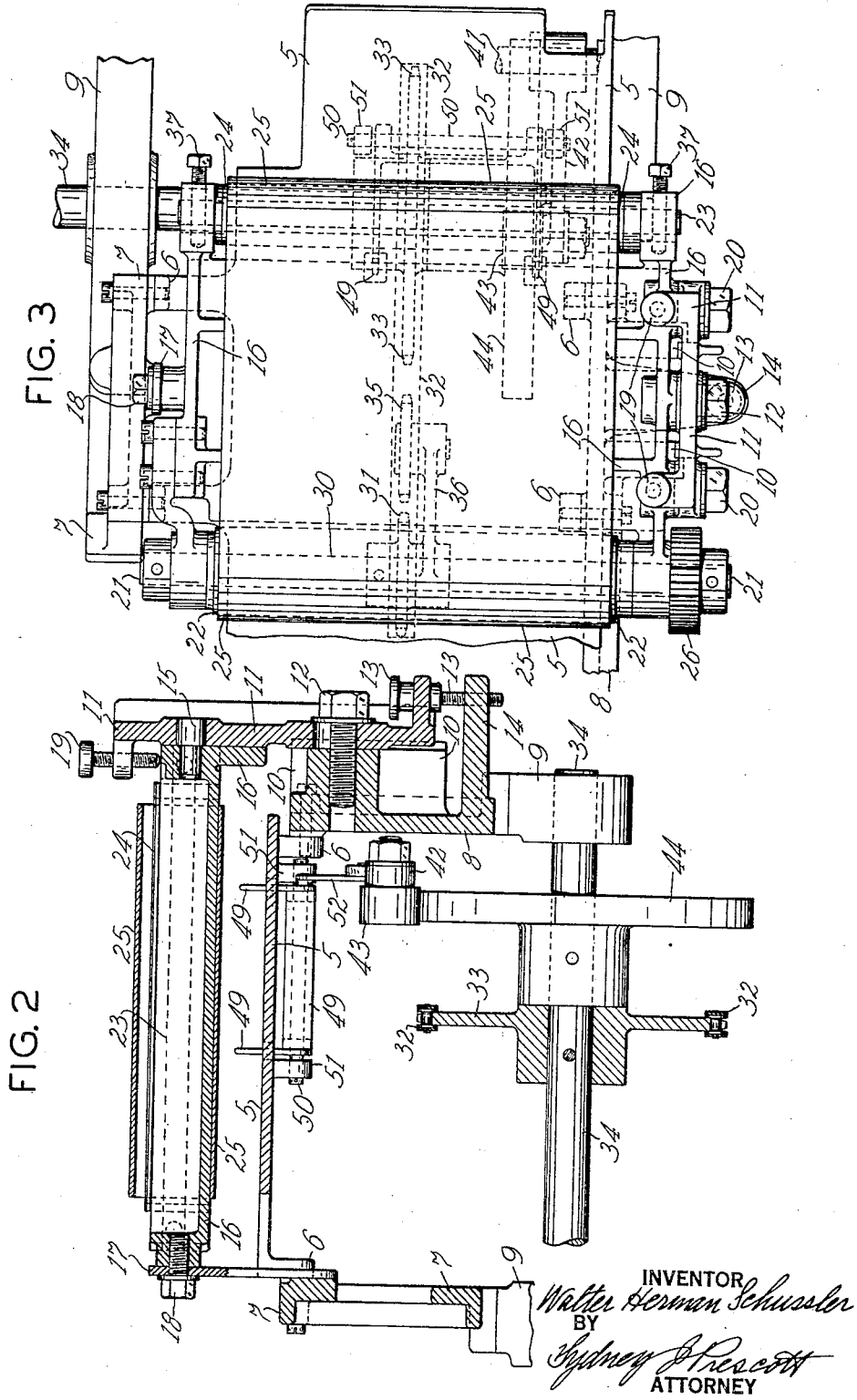

Patented Dec. 27, 1932

1,892,255

UNITED STATES PATENT OFFICE

WALTER HERMAN SCHUSSLER, OF PHILADELPHIA, PENNSYLVANIA, ASSIGNOR TO INTERNATIONAL CIGAR MACHINERY COMPANY, A CORPORATION OF NEW JERSEY

REROLLER FOR CIGAR MACHINES

Application filed February 16, 1932. Serial No. 593,351.

This invention relates to an improvement in cigar-making machines, its main object being to provide means for rerolling the finished cigar or bunch while being transferred to the delivery table of the machine.

This object is achieved by placing the finished cigar or bunch on an inclined delivery chute above which, at the proper distance slightly less than the thickness of the cigar or bunch, is mounted, parallel to the same, a continuously moving endless belt. On its way to the delivery table the cigar or bunch is thus rerolled between the delivery chute and the said belt, thereby softening and rounding it before it leaves the machine. With this and other objects not specifically mentioned in view, the invention consists in certain constructions and combinations hereinafter fully described and then specifically set forth in the appended claims.

In the accompanying drawings which form a part of this specification and in which like characters of reference indicate the same or like parts, Fig. 1 is a side elevation of the rerolling mechanism;

Fig. 2 is a sectional end elevation of the same, taken on line 2—2 of Fig. 1; and Fig. 3 is a plan view of the rerolling device seen from line 3—3 of Fig. 1.

In carrying the invention into effect there is provided a delivery table, an inclined chute arranged to deliver cigars to said table, a device for rerolling the cigars on said chute, means for intermittently delivering cigars to said chute, and a stop arranged in the path of the cigars on said chute and controlled by said means to permit the passage of cigars when said means delivers a cigar to said chute. In the best form of construction contemplated said device includes an endless travelling belt above said chute, and said means includes a stationary plate, an angle member, a cam lever carrying said member, and a cam for actuating said lever to move said angle member toward said plate to form a pocket for supporting the cigars and then withdraw said member to permit the cigars to drop on said chute. In the best form of construction contemplated, also, said stop is pivoted on said chute and the cam lever of said means is connected to the stop to move it in and out of the path of the cigars on said chute. These various means and parts may be widely varied in construction within the scope of the claims for the particular device selected to illustrate the invention is but one of many possible concrete embodiments of the same. The invention, therefore, is not to be restricted to the specific construction shown and described.

Referring to the drawings, the rerolling device consists of an inclined delivery chute 5 equipped with lugs 6 by which it is mounted on pedestals 7 and 8 supported by the main frame 9 of the cigar machine. Pedestal 8 is equipped with guideways 10 on which is slidable for adjustment a slotted supporting bracket 11 fastened to pedestal 8 by a screw 12 passing through the slot, said bracket 11 carrying an adjusting screw 13 engaging with a lug 14 of pedestal 8. On bracket 11, by means of a stud 15, is swingably mounted one end of a belt guide bracket 16, the other end of which is supported by pedestal 7 by means of a plate 17 and a screw 18. Adjusting screws 19 carried by lugs of bracket 11 serve to adjust the inclination of bracket 16 for different positions of bracket 11, the bracket 16 after such adjustment being locked in position by screws 20 in bracket 11.

Belt guide bracket 16 carries on one end a shaft 21 on which is mounted a roller 22 and on the other end a shaft 23 supporting a roller 24. Rollers 22 and 24 support an endless belt 25 driven by roller 22 on shaft 21 on which is mounted a gear 26 meshing with a gear 27 on stud 28, the latter gear being driven from a gear 29 mounted on a shaft 30. Shaft 30 carries a sprocket 31 which is driven by a chain 32 from a sprocket 33 on shaft 34 actuated from the main drive of the cigar machine. Chain 32 is held in tension by means of a tightener sprocket 35 mounted on an arm 36 swingably mounted on shaft 30. Shaft 23 at its ends is equipped with adjusting screws 37 acting as tighteners for belt 25.

The bunch or finished cigar C, Fig. 1, by a suitable transfer arm or other means, is placed for delivery into a pocket formed by a plate 38' supported by stationary arms 38 and an angle member 39' on the arm 39 of a cam lever. The cam lever is pivoted on a stud 41 and its arm 42 carries a cam roller 43 held in engagement with a disk cam 44 mounted on shaft 34 by spring 40. Stud 41 is mounted in an arm 45 supported on a stud 46 of a bracket 47 and adjustable by means of a screw 48. When roller 43 engages with the high portion of cam 44, as shown, arm 39 moves away from arm 38, allowing the cigar C to drop upon delivery chute 5. The latter is equipped with stops 49 pivoted on a stud 50 supported in lugs 51 of chute 5. Stops 49 are actuated from cam lever 42 by means of a link 52. When roller 43 leaves the high portion of cam 44, the stops 49 will therefore be withdrawn from interference with cigar C which then travels down on chute 5 and is rerolled by the action of belt 25 as it passes along chute 5 on to the delivery table 53.

What is claimed is:

1. The combination with a delivery table, of an inclined chute arranged to deliver cigars to said table, a device for rerolling cigars on said chute, means for intermittently delivering cigars to said chute, and a stop arranged in the path of the cigars on said chute and controlled by said means to permit the passage of cigars when said means delivers a cigar to said chute.

2. The combination with a delivery table, of an inclined chute arranged to deliver cigars to said table, a device for rerolling cigars on said chute, means for intermittently delivering cigars to said chute, and a stop arranged in the path of the cigars on said chute and controlled by said means to permit the passage of cigars when said means delivers a cigar to said chute, said rerolling device including an endless traveling belt above said chute and spaced therefrom a distance slightly less than the thickness of a cigar.

3. The combination with a delivery table, of an inclined chute arranged to deliver cigars to said table, a device for rerolling cigars on said chute, means for intermittently delivering cigars to said chute, and a stop arranged in the path of the cigars on said chute and controlled by said means to permit the passage of cigars when said means delivers a cigar to said chute, said means including a stationary plate, an angle member, a cam lever carrying said member, and a cam actuating said lever to move said angle member toward said plate to form a pocket to support the cigars and then withdrawn said member to permit the cigars to drop on said chute.

4. The combination with a delivery table, of an inclined chute arranged to deliver cigars to said table, a device for rerolling cigars on said chute, means for intermittently delivering cigars to said chute, and a stop arranged in the path of the cigars on said chute and controlled by said means to permit the passage of cigars when said means delivers a cigar to said chute, said stop being pivoted on said chute, and said means including a cam lever connected to said stop, and a cam actuating said lever to move said stop in and out of the path of the cigars on said chute.

5. The combination with an inclined chute adapted to deliver cigars, of a device for rerolling cigars on said chute, said chute being supported by stationary pedestals, and said device including a supporting bracket mounted on one of said pedestals, a belt guide bracket pivoted on said supporting bracket, pulleys mounted on said belt guide bracket, an endless belt running over said pulleys, means for adjusting said supporting bracket about its pivot to adjust its angle of inclination with respect to said inclined chute, and means for driving one of said pulleys.

6. The combination with an inclined chute adapted to deliver cigars, of a device for rerolling cigars on said chute, said device including an endless travelling belt above said chute, means for adjusting said belt with respect to said chute, and means for driving said belt in one direction only.

In testimony whereof, I have signed my name to this specification.

WALTER HERMAN SCHUSSLER.